United States Patent
Ellis

(12) United States Patent (10) Patent No.: US 6,345,832 B1
(45) Date of Patent: Feb. 12, 2002

(54) AXLE ADJUSTMENT APPARATUS

(75) Inventor: Rob Ellis, Newark, DE (US)

(73) Assignee: Fleetmaster, Inc., Edgmont, PA (US)

( * ) Notice: Subject to any disclaimer, the term of this patent is extended or adjusted under 35 U.S.C. 154(b) by 0 days.

(21) Appl. No.: 09/798,770

(22) Filed: Mar. 2, 2001

(51) Int. Cl.[7] ............................................... B62D 33/08

(52) U.S. Cl. ................................ 280/149.2; 280/407.1; 248/284.1

(58) Field of Search ........................ 180/209; 280/149.2, 280/407.1, 405.1; 224/545; 248/284.1, 318.8, 324

(56) References Cited

U.S. PATENT DOCUMENTS 5,346,233 A * 9/1994 Moser ..................... 280/149.2
5,658,000 A * 8/1997 Boudreaux ............... 280/149.2

* cited by examiner

*Primary Examiner*—Paul N. Dickson
(74) *Attorney, Agent, or Firm*—Lawrence A. Husick, Esq.; Lipton, Weinberger & Husick

(57) ABSTRACT

An apertured track and brace system for mounting a slider for adjusting the weight distribution of a semi-trailer. The apertured track is adapted to be mounted to both a semi trailer and to a carriage carrying a rear axle tandem, while a single type of brace is adapted to link the apertured track to other elements operable to slidably longitudinally position the axle tandem relative to the semi trailer itself.

2 Claims, 4 Drawing Sheets

AXLE ADJUSTMENT APPARATUS

FIELD OF THE INVENTION

The present invention is directed to mechanisms for adjusting the position of the rear axles on a dual axle truck semi-trailer. In particular, the present invention is directed to a mechanism which permits the rapid and easy reallocation of weight on such a semi-trailer.

BACKGROUND OF THE INVENTION

Presently, there are over 1.1 million tractor trailers in operation in the United States. Tractor-trailers are subject to extensive Federal and state weight regulations. The violation of these weight regulations may result in fines and penalties to the operator or owner of the trailer. When a tractor-trailer combination is loaded very near to its legal limit, it will frequently be weighed at a roadside weigh-station. Under applicable regulations, the weight of the loaded trailer must be distributed under a calculation known as the "bridge formula". The bridge formula determines the distribution of weight within the trailer and factors in the distance between the cab and the rear axles of the semi-trailer. When a truck is stopped on the road for a random weight measurement, it may have too much weight distributed over the rear axles. If the weight distribution falls outside the acceptable limits under the bridge formula, the truck will not be permitted to continue until the weight has been properly redistributed.

Rather than redistribute the weight within the trailer itself (which, depending on the cargo carried may be an impossible task), the operator customarily redistributes the weight by moving one or both of the axles of the semi-trailer. Unfortunately, the movement of the axles when a trailer is fully loaded is a difficult task. Most semi-trailers incorporate a wheeled tandem affixed to a carriage which is slidably adjustable along an apertured track on the trailer and which is retained in position by locking devices inserted into the apertures.

Presently, the vast majority of trailers are readjusted in the following manner: The operator (1) locks the rear tandem into place using the tandem axles brakes, (2) pulls a lever to disengage the locking pins, thus freeing the carriage to be adjusted along the trailer's length, (3) drives the tractor & trailer forward or back to drag the trailer overthe locked tandem axles till they are in the new desired position, and (4) releases the lever pulled in step 2 so that the pins re-engage in the new desired set of apertures, again locking the carriage position relative to the trailer.

There are several problems associated with this method for readjusting the position of a rear tandem. Initially, this method relies largely upon trial and error before the correct positioning is achieved. Because this method relies upon the power of the vehicle tractor to slide the trailer, precise incremental movements of the trailer are usually not possible. Furthermore, it is frequently difficult to manually remove the locking pins from the apertures. This may be particularly problematic in cold or inclement weather, or when the pins are frozen, locked or rusted.

Various alternative methods have been devised to redistribute the weight of a semi-trailer. U.S. Pat. No. 3,203,711, for example, discloses a floating axle attachment in which a fifth floating axle is slid beneath the semi-trailer. This method is expensive and requires a specialized cab and trailer configuration. Another type of prior art device adjusts the location of the trailer coupling in order to effectuate weight distribution and transfer. See, U.S. Pat. Nos. 2,832,610; 4,662,670; 3,402,944 and 2,153,468. The devices disclosed in these patents are similarly complex and require expensive hydraulic cab configurations. U.S. Pat. No. 2,153,468 discloses a load redistribution system which incorporates a separate trailer dolly which rides on the main trailer bed. A third type of prior art device is directed to a system which adjusts the length of the chassis or trailer bed. See U.S. Pat. No. 2,371,261. This method is similarly expensive and requires specialized trailer configurations.

One quite effective mechanism of the prior art for solving the tandem adjustment problem is that of U.S. Pat. No. 5,346,233, which discloses a power-actuated device which is simple and safe to operate in adjusting the position of the rear tandem.

SUMMARY OF THE INVENTION

After the invention of the adjustment system of U.S. Pat. No. 5,346,233, there has still been a need to further simplify and standardize the mechanism by which various mechnical and hydraulic actuators may be attached to the trailer and tandem of the truck. In particular, there has been a need to reduce the number and type of parts comprising the system. In addition, there has been a need to reduce the number of hydraulic cylinders employed from two to one, thus eliminating expense, alignment issues, and maintenance load. Along with the other needs recognized by the inventor of U.S. Pat. No. 5,346,233, the present invention represents a simplification of manufacture, installation, operation, and maintenance for a slide system for adjustment of the position of the tandem relative to the trailer.

DETAILED DESCRIPTION OF THE INVENTION

The slider of the present invention is described with reference to the enclosed Figures wherein the same numbers are used where applicable.

Figure 1:
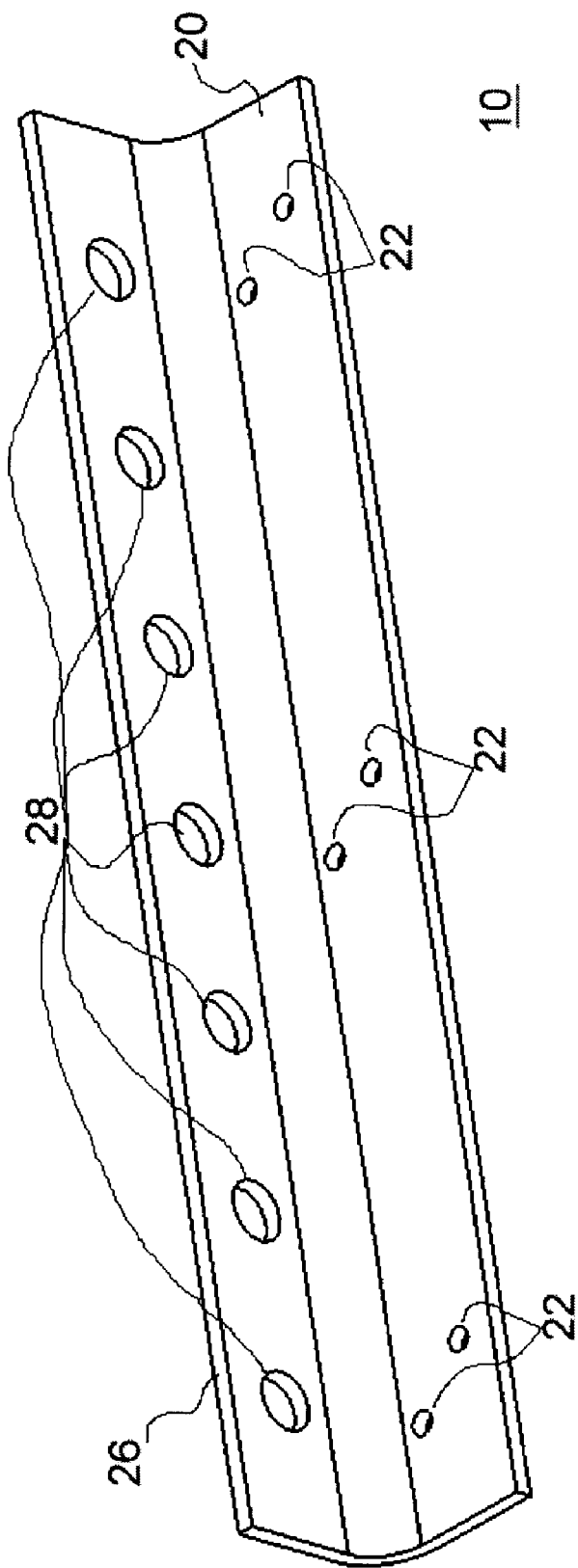
FIG. 1 is a side perspective view of the apertured track of the present invention, which is to be affixed to a semi-trailer having rear tandem axles.

The present invention is designed to be affixed to a tractor-trailer. Referring to FIG. 1, a side perspective view the apertured bracket 10 of the present invention is disclosed. The invention is preferably intended to be utilized on a double-axle semi-trailer. As noted in the Background of the Invention section, such trailers are subject to extensive federal and state weight regulation, and are required to specifically comply with weight restrictions calculated pursuant to the so-called "bridge formula".

Referring now to FIG. 1, a trailer (not shown) has a tandem set of axles comprising eight wheels, which are retained on a carriage (all not shown.) The carriage is slidable along two parallel tracks, of which, one track 10 is depicted. (The tracks extend along opposite sides of the trailer.) In addition, up to three pairs of parallel tracks 10 are used on the underside of the trailer to mount the components of the present invention. Track 10 comprises a base flange 20, having a plurality of mounting apertures 22 adapted to receive fastening means (not shown) for securing track 10 to the trailer. Track 10 also comprises a side flange 26, at a substantially right angle to base flange 20. Side flange 26 has a plurality of apertures 28 through which retaining members can be inserted and retracted in order to maintain and fix the position of the wheels, or through which permanent retaining members may be inserted to mount mechanical elements of the present invention. The apertures 28 on the trailer extend completely along the tracks. In this respect, the rear most apertures 28 on the trailer of the present invention are not sealed off. The trailer further includes a retractable landing gear (not shown) which is utilized to support the trailer in an upright position when the trailer is not supported by a cab.

Figure 2:
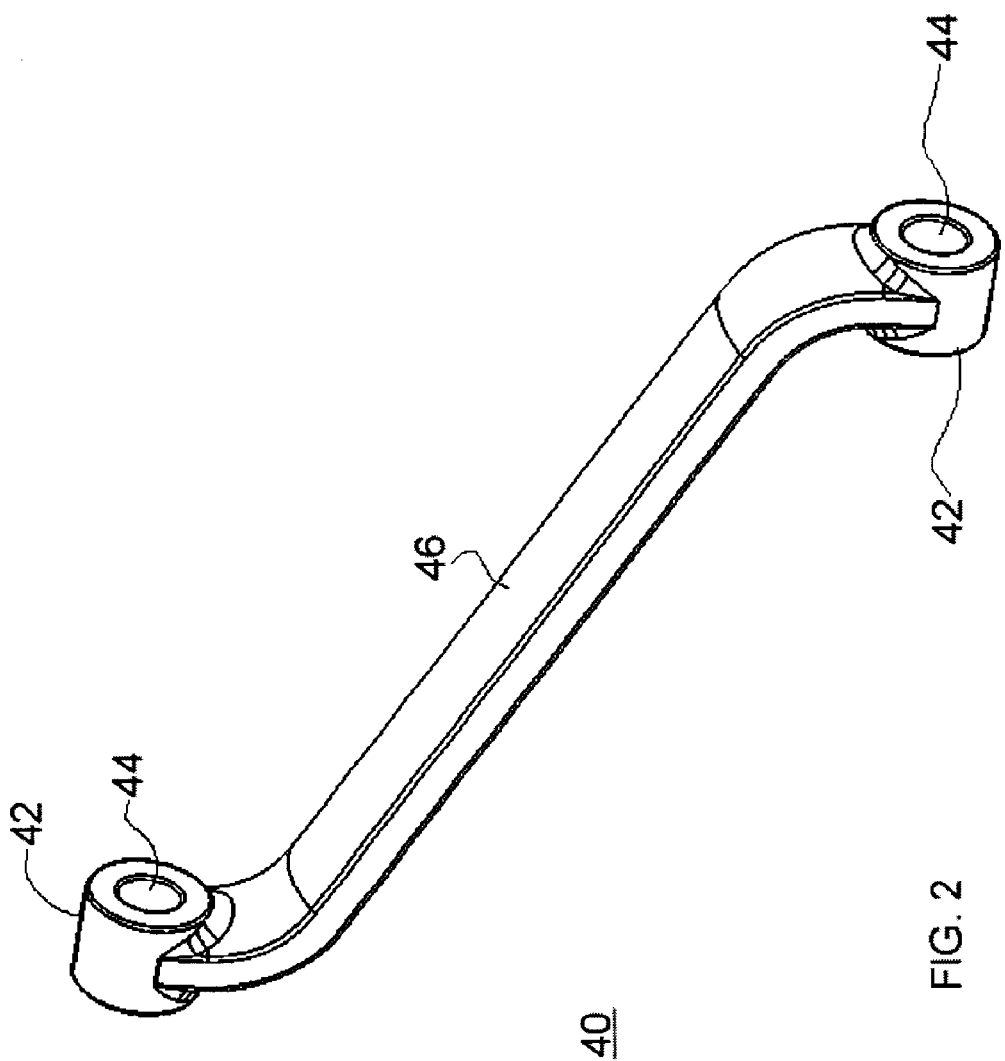
FIG. 2 is a perspective view of the brace of the present invention.

Referring now to FIG. 2, there is depicted one brace 40 of the present invention. Brace 40 is comprised of a shaft 46, terminating in a mounting flange 42 at each end thereof. Each mounting flange 42 is provided with a bore 44, adapted to receive a retaining member (not shown) such as a bolt, locking pin, or the like, for engagement with an aperture 28 in track 10. Bores 44 are parallel to each other, and are offset from each other in space because their attachment to shaft 46 is angled. The angels employed are complimentary to each other, however, the selection of the complementary angle is a matter of engineering choice, as is the length of shaft 46, selected by one of skill in the art based on a variety of factors including the spacing of parallel tracks 10, the weight and strength of the material from which brace 40 is fabricated, and the desired vertical distance from track 10 to the depending flange 42 when brace 40 is mounted to the trailer.

Figure 3:
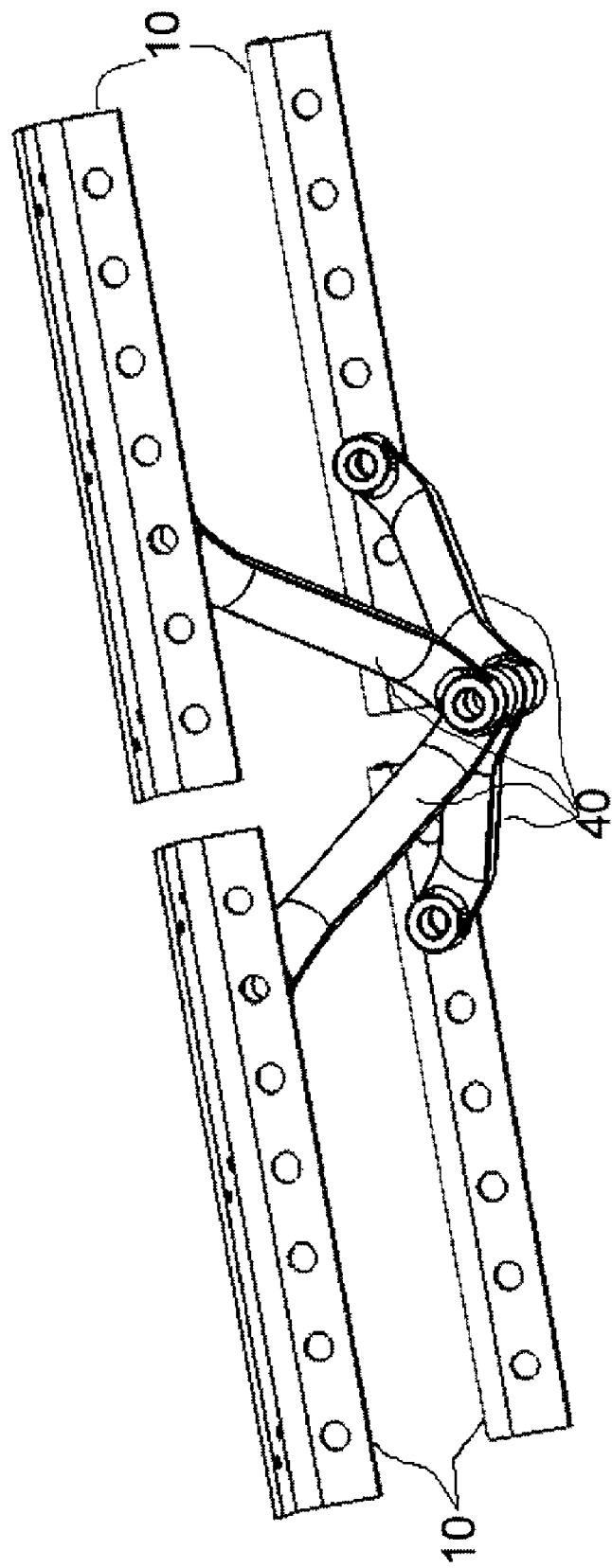
FIG. 3 is a bottom perspective view of the assembly of four braces of the present invention, mounted to two pairs of two parallel apertured tracks of the present invention.

Referring now to FIG. 3, there is depicted a bottom perspective view of the assembly of four braces 40 of the present invention, mounted to two pairs of two parallel apertured tracks 10 of the present invention. Tracks 10 are mounted to the underside of a trailer in parallel pairs, but offset laterally by the depth of bore 44 of mounting flange 42. In this manner, four braces 40 may be fixed to tracks 10 in a configuration such that, when their four depending flanges 42 have their bores 44 aligned in space, a pseudo-frustoconical or pryamidal configuration results. This pyramidal configuration provides a single attachment point for, for example, a hydraulic or pneumatic cylinder used to adjust the position of the axle tandem relative to the trailer. The pyramidal configuration is, when secured with bolts or similar fasteners, dimensionally stable and strong enough to withstand the forces required to reposition the axle tandem. The selection of the spacing of the legs of the pyramid of braces 40 with respect to each other is left to the engineering judgment of one skilled in the art, as alignment of the cylinder may be of critical interest. However, once secured, the pyramid of braces 40 need not be repositioned in normal operation.

Figure 4:
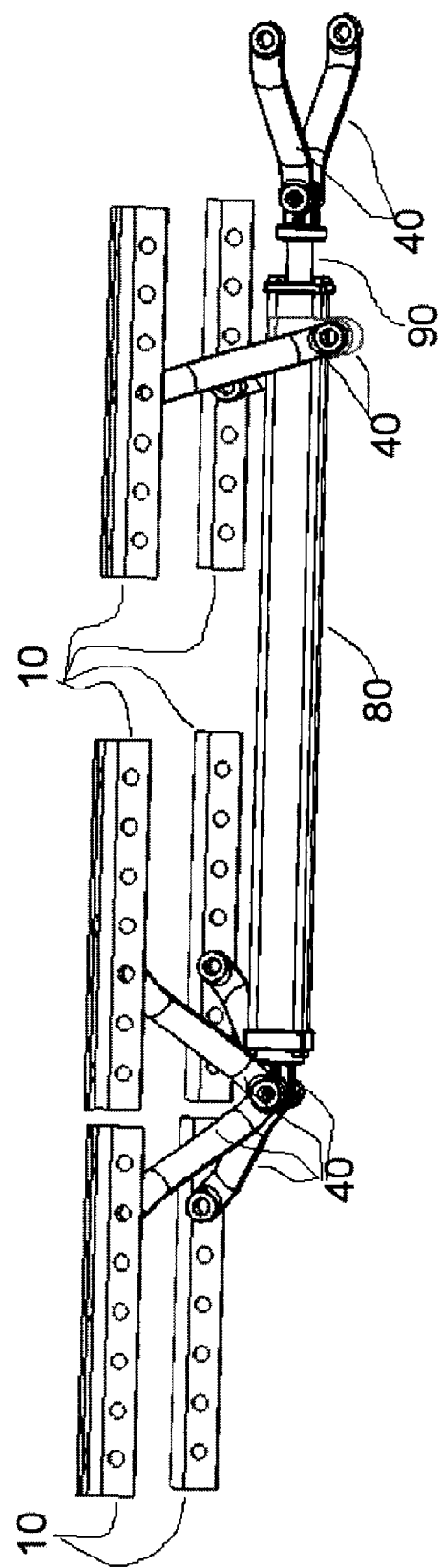
FIG. 4 is a bottom perspective view of the mounting of a hydraulic cylinder for longitudinal positioning of an axle tandem of a semi trailer, using six braces of the present invention, mounted to six apertured tracks of the present invention.

Referring now to FIG. 4, a bottom perspective view of the mounting of a hydraulic cylinder 80 for longitudinal positioning of an axle tandem of a semi trailer (not shown), using eight braces 40 of the present invention, mounted to six apertured tracks 10 of the present invention is shown. Cylinder 80 is mounted at its forward end to a pyramid of 4 braces 40, mounted to two pairs of two tracks 10. An additional pair of tracks 10, support an additional pair of braces 40 mounted to the rearmost end of cylinder 80, to support and align the cylinder during operation. Piston 90 is extendably inserted into cylinder 80, and is provided with a pair of braces 40 at its rearmost end, which are secured to the axle tandem (not shown).

In operation, a pneumatic system engages and retracts the trailer's locking pins which secure the axle tandem to the trailer. When retracted, a sensor permits energizing of a power source for actuation of piston 90 within cylinder 80 to reposition the axle tandem relative to the trailer. Once properly positioned, the pneumatic system re-engages locking pins to secure the axle tandem to the trailer in a fixed position. A "dead man switch" prevents operation of the system unless the operator maintains contact with the switch, in order to prevent injury to the operator and damage to the trailer or tandem.

It will be recognized by one skilled in the art that the system of the present invention, which employs only two structural members (bracket 10 and brace 40) to connect the various elements of the actuation system to both the trailer and the axle tandem provides many benefits including reduced manufacturing costs, design costs, storage costs, inventory complexity and costs, reduced shipping errors, and simplified installation and maintenance.

It is to be recognized by those skilled in the art that numerous embodiments fall within the spirit an scope of the present invention, and that the true nature and scope of the invention is to be determined with reference to the claims appended hereto. It is also the expressed condition placed on this application by the inventor that it is to be interpreted solely in accordance with the laws in effect as of the date of its filing, and that no later enacted law or decided case shall narrow the scope of the claims hereof in any way.

I claim as my invention:

1. In a system for adjusting the position of the dual rear axle assembly of a semi-trailer of the type having a track extending longitudinally along the bottom thereof which is provided with a longitudinal array of apertures; a slidable carriage, supporting a dual rear axle assembly having wheels at each end of its axles; said carriage being mounted on said track for sliding motion along said track to a desired position; and pin means affixed to said carriage, said pin means being extendable into said apertures to fix the position of said carriage with respect to said track and being retractable to permit sliding of said carriage along said track; braking means for holding said semi-trailer fixed while leaving said wheels free to roll along the ground; controllable carriage-positioning means for selectively adjusting the longitudinal position of said carriage along said track as said wheels thereof roll along the ground; the improvement comprising the combination therewith of:

(a) one or more of pairs of substantially identical parallel tracks, the tracks each comprising a base flange, having a plurality of mounting apertures adapted to receive fastening means for securing the track to the trailer, a side flange, at a substantially right angle to the base flange and having a plurality of apertures in the side flange adapted to receive retaining members that are either retractably inserted therein in order to maintain and fix the position of the wheels, or fixedly inserted therein to mount mechanical elements to the tracks, and (b) one or more pairs of braces, each brace comprising a shaft, terminating in a mounting flange at each end thereof, the mounting flanges having parallel bores adapted to receive a retaining member, the mounting flanges being mounted on the shaft at complimentary angles to provide an offset distance therebetween.

2. The system of claim 1 wherein two parallel pairs of tracks and two pairs of braces are combined to form a pyramidal brace structure having four braces as the legs thereof, for providing a dimensionally stable mounting point for attachment of the mechanical elelments to the tracks, wherein the tracks are mounted to the trailer at a lateral offset distance adapted to provide lateral spacing of the mounting flanges of the braces when the bores therein are longitudinally aligned.

* * * * *